May 13, 1952  R. C. HOFF  2,596,554
MAGNETIC PULLEY
Filed Sept. 8, 1950

INVENTOR.
RONALD C. HOFF
BY
Oldham & Oldham
ATTORNEYS

Patented May 13, 1952

2,596,554

UNITED STATES PATENT OFFICE 2,596,554

MAGNETIC PULLEY

Ronald C. Hoff, Erie, Pa., assignor to Eriez Manufacturing Company, Erie, Pa., a corporation of Pennsylvania Application September 8, 1950, Serial No. 183,856

8 Claims. (Cl. 209—219)

This invention relates to magnetic pulleys or roll type separators wherein the attracting or holding power of the magnetic pulley is provided by permanent magnets.

In the manufacture of permanent magnet types of magnetic pulleys or roll separators, it has been difficult to assemble these pulleys in a convenient, inexpensive manner and obtain an efficient practical structure. Usually it is highly desirable to have the permanent magnet associated with at least a portion of the pulley before the magnet is magnetized. Also, it has been somewhat difficult heretofore to provide magnetic pulleys which have desirable strength therein to carry the physical loads applied thereto without any possible distortion of the load carrying means of the pulley. Usually it is desirable that the magnetic pulleys have smooth, tight cylindrical surfaces that usually are made up from a plurality of strip members whereby loads can be directly applied to the pulley, or a belt can be carried by the pulley, dependent upon the use to be made of the pulley or separator.

The general object of the present invention is to provide a new and improved type of a magnetic pulley which has high magnetic strength per unit weight thereof and which is relatively inexpensive to manufacture.

Another object of the invention is to provide a magnetic pulley wherein the magnet portions of the pulley can readily be formed into subassemblies, be magnetized, and can be easily combined with each other and the remainder of the pulley structure for completion of the pulley.

A further object of the invention is to provide a pole piece in a magnetic pulley in the class described which pole piece is of decreased weight to reduce the cost thereof and increase the magnetic saturation of such pole piece.

Another object of the invention is to provide a better, less costly type of a magnet holding means in a magnetic pulley and to facilitate the assembly of the components of the pulley.

Another object of the invention is to simplify the pulley assembly by use of reinforcing or stiffener plates made from non-magnetic material to aid in positioning the insulation or spacer bars used in the magnetic pulley, which plates are usually welded to the pole pieces prior to assembly of same in the pulley.

The foregoing and other objects and advantages of the invention will be made more apparent as the specification proceeds.

For a better understanding of the invention, reference should be had to the accompanying drawings wherein one presently best known embodiment of the invention is illustrated, and wherein.

Corresponding numerals will be used in the accompanying drawings and the following specification to refer to the same parts for facilitating cross-reference between similar parts shown in the drawings and referred to in the specification.

The present invention resides in the provision of a magnetic pulley having a plurality of pole pieces in circumferentially spaced relation, a plurality of spacer bars each of which is positioned intermediate a pair of circumferentially adjacent members of said pole pieces, a plurality of permanent magnets positioned in spaced circumferential relation with foot portions of the magnets contacting one member of alternate circumferentially adjacent pairs of pole pieces, nonmagnetic reinforcing strips extending between alternate circumferentially adjacent pairs of said pole pieces and positioning them in fixed relation to each other, means extending between said spacer bars associated with said reinforcing strips and said magnets to unify them with said strips and pole pieces, and means for securing the remaining spacer bars in position.

Figure 1:
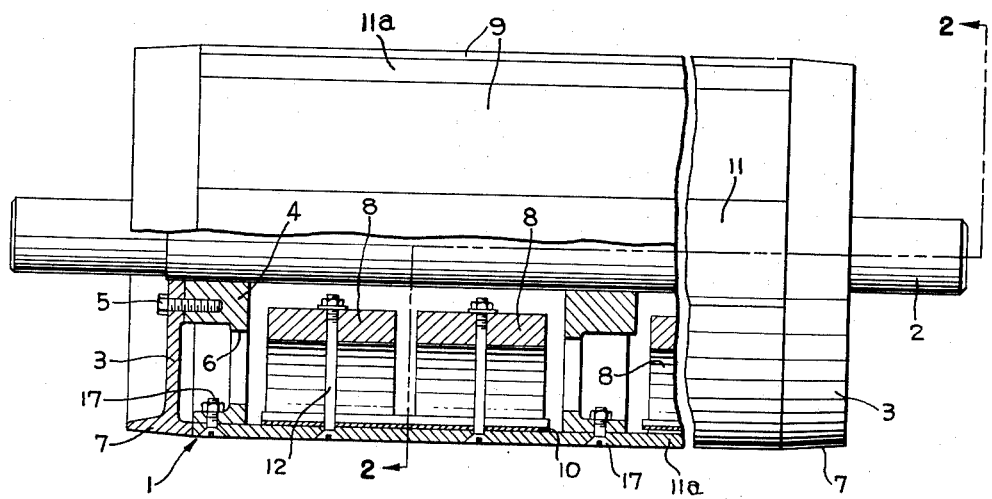
Fig. 1 is a longitudinal section taken on line 1—1 of Fig. 2.

For a complete understanding of the invention, reference should be had to the details of the structure shown in the accompanying drawings, and wherein a magnetic pulley is indicated in general by the numeral 1. The pulley 1 is positioned on a suitable shaft 2 with the pulley being secured to the shaft 2 by end supports 4, of suitable non-magnetic construction, which are engaged with the shaft 2 in a conventional manner, and which have end discs 3 of the pulley 1 secured thereto by conventional means, such as cap screws 5. The end discs 3 are likewise made from suitable non-magnetic material. The end supports 4 may have apertures 6 provided therein. Fig. 1 best indicates that axially outwardly extending edge flanges 7 are provided on the radially outer edges of the end supports 4 to facilitate assembly of the different portions of the pulley 1, as will hereinafter be explained.

The magnetic forces provided in the pulley 1 are furnished by means of suitable magnetic castings 8, usually are of substantially U-shape in contour, which terminate in relatively widely spaced foot portions that individually contact elongate pole pieces 9. These pole pieces 9 usually comprise slightly arcuate metal strips or bars that are adapted to be combined with suitable spacer members, hereinafter described, to form a continuous cylindrical surface of the pulley. The castings or magnets 8 extend circumferentially of the pulley 1 and any desired number of magnets may be correspondingly associated with longitudinally spaced parts of the pole pieces 9. As a feature of the invention, the pole pieces 9 are relatively thin, and usually are inexpensively and suitably formed, as by rolling or shaping, from a bar or strip of magnetically permeable material, such as iron.

Figure 2:
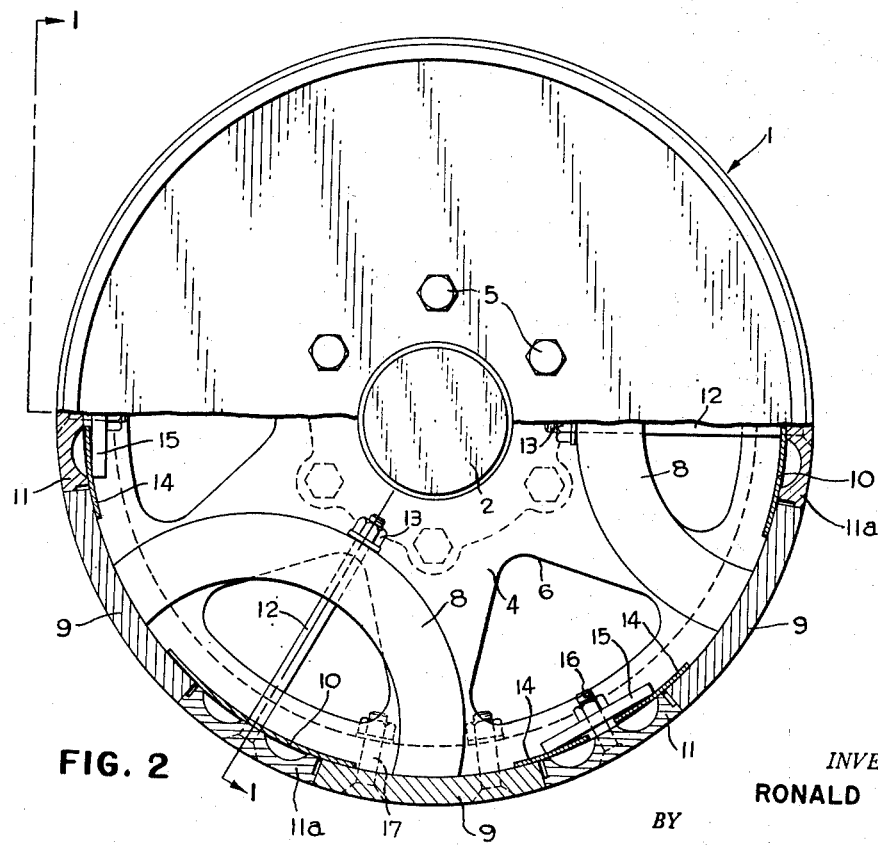
Fig. 2 is a vertical section taken on line 2—2 of the magnetic pulley shown in Fig. 1.

As an important feature of the present invention and to facilitate assembly of the components of the pulley 1, pairs of pole pieces for forming the poles of one or more correspondingly positioned magnets are secured together with a relatively thin, non-magnetic, arcuate in shape, supporting or reinforcing strip 10. The support or reinforcing strip 10, usually is spot welded to the radially inner surfaces of the pole pieces 9 and extends therebetween to position a pair of pole pieces in desired spaced relation to form a portion of the periphery of the pulley. A plurality of sets of spacer or insulation bars 11 and 11a, which are of arcuate external contour and usually have the same thickness as the pole pieces 9, are provided in the pulley 1 and one example of the spacer bars 11a is shown in Fig. 2 and illustrates how such bars 11a are snugly received between the circumferentially adjacent edge portion of the pole pieces 9. The spacer bars 11, pole pieces and magnetic castings are formed into a subassembly for the pulley by means of conventional devices, such as bolts 12, which engage with the spacer bars 11a, extend through the reinforcing strip 10 and suitably engage with base portions of the magnetic castings 8 by means of nuts 13. The bolts 12 serve to draw the spacer bars 11a tightly against the reinforcing strips 10 which thereby in turn force the pole pieces 9 against the foot or end portions of the magnetic castings 8 and form sub-assemblies for the pulley.

It will be appreciated that the pole pieces 9 and spacer bars 11 and 11a may be of any desired length and that the magnetic castings secured to longitudinally spaced portions of the pole pieces must have the same poles thereof in association with the same pole piece.

Another important structural feature of the present pulley is that a relatively narrow or short positioner or support or stiffener strip 14 is secured to one edge of each of the pole pieces 9 and protrudes a short distance therefrom. These positioner strips 14 are associated with the laterally outer edge portions of the pole pieces 9 in the subassemblies formed therefrom.

In order to reinforce and position the spacer bars 11 that are positioned intermediate the different assemblies or units of the pulley 1, lock bars or bridge strips 15 are positioned on the radially inner surfaces of the positioner strips 14 and bridge over the adjacent portions thereof which normally are in circumferentially spaced relation to each other. Bolts 16, or similar means may extend between the lock bars 15 and the spacer bars 11 for securing them together in desired relation.

It will be seen that the sub-assembly formed by pairs of pole pieces and reinforcing strips associated therewith can be individually and easily secured to and extend between the end members 4 by any conventional means, such as bolts 17. Thereafter, the spacer or lock bars 15 are secured in position by use of the bolts 16 to complete the pulley 1. It will be appreciated that any desired number of axially spaced lock bars 15 and bolts 16 may be used to position any individual spacer bars 11.

It should be noted that the reinforcing strips 10, spacer bars 11 and 11a, and the positioner strips 14 will be made from a suitable non-magnetic material, such as stainless steel. Normally the magnetic castings 8 are magnetized after they have been formed into a subassembly with their associated pole pieces and reinforcing strips. Usually the positioner strips 14 are spot welded to the pole pieces that carry them and the construction shown indicates that the peripheral surfaces of the pole pieces and spacer bars normally combine to form a substantially cylindrical surface on the pulley 1. The spacer bars are in all instances thoroughly reinforced and securely positioned by means of the reinforcing and positioner strips provided therefor to provide a sturdy, magnetic drum having a smooth, tight cylindrical surface.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. In a magnetic pulley, a subassemby consisting of a pair of pole pieces, a magnetic casting of substantially U-shape and having a pair of foot portions, a non-magnetic support strip welded to and extending between said pole pieces and positioning same in spaced relation, a non-magnetic spacer bar positioned between said pole pieces, said casting being positioned on the opposite side of said support strip as said spacer bar with its foot portions adjacent different ones of said pole pieces, and bolt means extending from said spacer bar through said support strip to said casting to draw said spacer bar against said support strip and said pole pieces against the foot portions of said castings to form a unit thereof, said spacer bar filling the space between said pole pieces.

2. In a magnetic pulley, a pair of pole pieces, a magnetic casting of substantially U-shape and having a pair of foot portions, a non-magnetic relatively thin support strip secured to the inner faces of said pole pieces at the edges thereof and extending between said pole pieces to position same in spaced relation, a non-magnetic spacer bar positioned in and filling the space between said pole pieces, said spacer bar being on the outer surface of said support strip, and bolt means extending from said spacer bar to said casting to seat said spacer bar against said support strip and the inner faces of said pole pieces against the foot portions of said castings, said pole pieces and spacer bars being of the same thickness.

3. In a magnetic pulley, a pair of pole pieces, a magnetic casting of substantially U-shape and having a pair of foot portions, a non-magnetic reinforcing strip secured to and extending between said pole pieces and positioning same in spaced relation, a non-magnetic spacer bar positioned between said pole pieces, and means extending from said spacer bar to said casting through said strip to draw said spacer bar against said reinforcing strip and thereby said pole pieces against the foot portions of said casting and form a unit therefrom.

4. In a drum-type magnetic pulley, a pair of pole pieces, a positioner strip secured to each of said pole pieces and protruding a short distance therefrom, means positioning said pole pieces in spaced circumferential relation with said strips extending towards each other but being positioned in spaced circumferential relation, a spacer bar positioned between said pole pieces and extending over said strips, a lock bar bridging over said strips on the opposite face of same as said spacer bar, and means extending between said lock bar and spacer bar to secure said spacer bar in place.

5. In a drum-type magnetic pulley, a pair of pole pieces, a non-magnetic positioner strip secured to an edge portion of each of said pole pieces and protruding a short distance therefrom, end plate means positioning said pole pieces in spaced circumferential relation with said strips extending towards but being spaced from each other, a spacer bar positioned between said pole pieces and contacting said strips, a lock bar bridging over said strips on the opposite face of same as said spacer bar, and means extending between said lock bar and spacer bar to secure said spacer bar in place with the outer surface thereof substantially flush with the surfaces of said pole pieces.

6. A magnetic pulley comprising a plurality of pole pieces positioned in circumferentially spaced relation, a plurality of spacer bars each of which is positioned intermediate two adjacent members of said pole pieces, a plurality of permanent magnets having foot portions positioned in spaced circumferential relation with foot portions of the magnets contacting one member of adjacent pairs of pole pieces, non-magnetic reinforcing strips extending between the pairs of said pole pieces which have one of said magnets contacting same, and with one of said strips contacting the innerface of one of said spacer bars, means extending between said spacer bars having a magnet radially aligned therewith and said magnets to secure same together, a positioner strip secured to each said pole piece and extending therefrom towards the adjacent one of said pole pieces that contacts a different one of said magnets, a pair of said positioner strips contacting one of said spacer bars, lock bars bridging over said positioner strips on the opposite face thereof from said spacer bars, and means extending between said lock bars and said spacer bars radially thereadjacent to secure such spacer bars in position.

7. A magnetic pulley comprising a pair of non-magnetic end members, a plurality of pole pieces secured to and extending between said end members in circumferentially spaced relation, a plurality of spacer bars one of which is positioned intermediate each pair of adjacent members of said pole pieces, a plurality of permanent magnets having foot portions positioned in spaced circumferential relation with one foot portion of each of the magnets contacting one member of adjacent pairs of pole pieces, and with one said pole piece contacting only one end of said magnets, non-magnetic support strips extending between the pairs of said pole pieces contacting said magnets and contacting the inner-faces of the spacer bars positioned circumferentially intermediate the pairs of said pole pieces contacting said magnets, bolt means extending between certain said spacer bars and the magnets radially aligned therewith to secure same together and draw said spacer bars against said support strips, a positioner strip secured to an edge portion of each of said pole pieces and extending therefrom towards the adjacent one of said pole pieces that contacts a different one of said magnets, one face of each of said positioner strips contacting the said spacer bar thereadjacent, a pair of circumferentially adjacent positioner strips having adjacent edge portions in circumferentially spaced relation, lock bars bridging over the adjacent edge portions of said positioner strips on the opposite face thereof from said spacer bars, and means extending between said lock bars and said spacer bars radially thereadjacent to secure such spacer bars in position.

8. In a magnetic pulley, a pair of pole pieces, a magnetic casting of substantially U-shape and having a pair of foot portions, a non-magnetic reinforcing strip welded to and extending between said pole pieces and positioning same in spaced relation, a non-magnetic spacer bar positioned between said pole pieces, said casting being positioned on the opposite side of said reinforcing strip as said spacer bar and with its foot portions adjacent different ones of said pole pieces, bolt means extending from said spacer bar to said casting through said reinforcing strip to draw said spacer bar against said reinforcing strip and said pole pieces against the foot portions of said castings to make a unit thereof, said spacer bar filling the space between said pole pieces, and a non-magnetic positioning strip secured to each of said pole pieces and extending laterally outwardly therefrom with relation to the other of said pole pieces.

RONALD C. HOFF.

REFERENCES CITED

The following references are of record in the file of this patent:

UNITED STATES PATENTS

| Number | Name | Date |
| --- | --- | --- |
| 1,529,570 | Bethke | Mar. 10, 1925 |
| 2,466,839 | Caldwell | Apr. 12, 1949 |
| 2,535,719 | Blind | Dec. 26, 1950 |